(12) United States Patent
Lawson et al.

(10) Patent No.: US 7,801,638 B2
(45) Date of Patent: *Sep. 21, 2010

(54) SYSTEMS AND METHODS OF IDENTIFYING AND MANIPULATING OBJECTS

(75) Inventors: Frank J. Lawson, Eagle Point, OR (US); Bruce B. Cullen, Klamath Falls, OR (US); Larry W. Oberholtzer, Hillsboro, OR (US); Gregory A. Pickens, Klamath Falls, OR (US); Robert J. Reifel, Klamath, OR (US)

(73) Assignee: Jeld-Wen, inc., Klamath Falls, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/491,874

(22) Filed: Jun. 25, 2009

(65) Prior Publication Data

US 2009/0299516 A1    Dec. 3, 2009

Related U.S. Application Data

(63) Continuation of application No. 11/106,224, filed on Apr. 14, 2005, now Pat. No. 7,640,073.

(51) Int. Cl.
*G06F 19/00* (2006.01)
(52) U.S. Cl. ........................ 700/186; 348/128
(58) Field of Classification Search ............. 700/186; 348/128; 264/102, 322; 33/18.1, 20.1; 5/456
See application file for complete search history.

(56) References Cited

U.S. PATENT DOCUMENTS

| | | | |
|---|---|---|---|
| 4,179,707 A | 12/1979 | Sjodin | |
| 4,437,284 A | 3/1984 | Cribben et al. | |
| 4,844,968 A | 7/1989 | Persson et al. | |
| 4,879,752 A | 11/1989 | Aune et al. | |
| 4,941,100 A | 7/1990 | McFarlane et al. | |
| 4,970,840 A | 11/1990 | Ouellette et al. | |
| 5,050,359 A | 9/1991 | Lorge et al. | |
| 5,086,596 A | 2/1992 | Schlyper et al. | |
| 5,088,533 A * | 2/1992 | Binder | 144/364 |
| 5,105,591 A | 4/1992 | Leopold | |

(Continued)

FOREIGN PATENT DOCUMENTS

CA    2050316    7/1991

(Continued)

OTHER PUBLICATIONS

Walsh, John, P., Post-Press Molding of Fiberboard Door Skins, PCT, WO 98/57797.

(Continued)

*Primary Examiner*—Kidest Bahta
(74) *Attorney, Agent, or Firm*—Stoel Rives LLP

(57) ABSTRACT

Systems and methods of identifying and manipulating objects are disclosed. One system disclosed comprises a light source adapted to emit a collimated light beam onto a contoured surface, a sensor adapted to view a profile of the contoured surface illuminated by the collimated light beam, a processor in communication with the sensor, and a controller in communication with the processor. The controller may be adapted to generate a signal based on an attribute of a predefined profile.

18 Claims, 6 Drawing Sheets

U.S. PATENT DOCUMENTS

| | | | |
|---|---|---|---|
| 5,141,110 A | 8/1992 | Trischan et al. | |
| 5,183,622 A * | 2/1993 | Persson | 264/320 |
| 5,189,490 A | 2/1993 | Shetty et al. | |
| 5,345,743 A | 9/1994 | Baier | |
| 5,361,476 A | 11/1994 | Leopold | |
| 5,394,342 A | 2/1995 | Poon | |
| 5,418,608 A | 5/1995 | Caimi et al. | |
| 5,487,245 A | 1/1996 | Dazo et al. | |
| 5,494,715 A | 2/1996 | Glover | |
| 5,501,888 A | 3/1996 | Hanson et al. | |
| 5,555,684 A | 9/1996 | Galowitz et al. | |
| 5,603,585 A | 2/1997 | Bruchu et al. | |
| 5,608,527 A | 3/1997 | Valliant et al. | |
| 5,761,070 A | 6/1998 | Conners et al. | |
| 5,791,215 A | 8/1998 | Morrison et al. | |
| 5,836,119 A | 11/1998 | Emmanuel | |
| 5,840,391 A | 11/1998 | Eichhorn et al. | |
| 5,953,232 A | 9/1999 | Blaimschein | |
| 6,092,343 A * | 7/2000 | West et al. | 52/309.11 |
| 6,133,948 A | 10/2000 | Abbott et al. | |
| 6,137,577 A | 10/2000 | Woodworth | |
| 6,160,479 A * | 12/2000 | .ANG.hlen et al. | 340/555 |
| 6,167,662 B1 | 1/2001 | Gruber | |
| 6,177,156 B1 | 1/2001 | Glover et al. | |
| 6,222,628 B1 | 4/2001 | Corallo et al. | |
| 6,240,685 B1 | 6/2001 | Eichhorn | |
| 6,244,012 B1 | 6/2001 | McGlinchy et al. | |
| 6,295,737 B2 * | 10/2001 | Patton et al. | 33/18.1 |
| 6,298,275 B1 | 10/2001 | Herman, Jr. | |
| 6,380,503 B1 | 4/2002 | Mills et al. | |
| 6,441,908 B1 | 8/2002 | Johnston et al. | |
| 6,546,127 B1 | 4/2003 | Seong et al. | |
| 6,636,310 B1 | 10/2003 | Ben-Dov et al. | |
| 6,636,610 B1 * | 10/2003 | Betts | 381/345 |
| 6,651,304 B2 | 11/2003 | McGlinchy et al. | |
| 6,674,517 B2 | 1/2004 | Yamaguchi et al. | |
| 6,678,062 B2 | 1/2004 | Haugen et al. | |
| 7,051,445 B1 * | 5/2006 | Karapetyan | 33/285 |
| 7,370,454 B2 * | 5/2008 | Lynch et al. | 52/784.1 |
| 2002/0085093 A1 | 7/2002 | Frigon et al. | |

FOREIGN PATENT DOCUMENTS

| | | |
|---|---|---|
| DE | 10002230 A1 | 7/2001 |
| EP | 0496968 A1 | 8/1992 |
| EP | 1093899 A1 | 4/2001 |
| JP | 62157758 | 7/1987 |
| JP | 05180638 | 7/1993 |
| RU | 2058546 | 4/1996 |
| RU | 2219580 | 12/2003 |
| WO | 9011488 | 10/1990 |
| WO | 9222786 | 12/1992 |
| WO | 03027783 A1 | 4/2003 |

OTHER PUBLICATIONS

PCT International Preliminary Report on Patentability of corresponding International Application No. PCT/US2006/012897, mailed Oct. 25, 2007.

International Search Report, dated Dec. 1, 2006.

May 14, 2009 Office action in the corresponding Australian Pat. Appl. No. 2006236946.

Sep. 22, 2009 Office action in the corresponding Canadian Pat. Appl. No. 2,604,561.

Machine translation of EP1093899A1.

* cited by examiner

SYSTEMS AND METHODS OF IDENTIFYING AND MANIPULATING OBJECTS

CROSS REFERENCE TO RELATED APPLICATIONS

This application claims the benefit of and is a continuation of U.S. application Ser. No. 11/106,224, filed on Apr. 14, 2005 now U.S. Pat. No. 7,640,073, now allowed, which is assigned to the assignee of the present application, and which is incorporated in its entirety herein by reference.

FIELD OF INVENTION

The present invention relates to systems and methods of identifying and manipulating objects, and more particularly identifying and manipulating objects having a contoured surface.

BACKGROUND

Fiberboard door skins can be manufactured by pressing wood composites, along with resins, glues, and other substances, into thin layers, which then can be laminated or adhered to a core, frame or other support to simulate a solid, natural wood door. Fiberboard door skins have the advantages of being economical, not easily damaged, durable over time, and light-weight.

Fiberboard door skins further provide an efficient way to incorporate various aesthetically-pleasing patterns into the faces of a door without requiring intricate routing and other labor-intensive woodworking methods. One difficulty with pressing door skins, however, is that the edges of the pressed door skins generally are rough and non-uniform. These edges must be trimmed to precise dimensions with respect to an embossed profile before coupling a door skin to the door frame.

A current method of trimming door skins to the desired size involves aligning one of the uneven edges with a physical guide, edge, or plate and cutting the door skin at a predetermined or measured distance from the guide. This method can result in trimmed door skins that are dimensionally out of tolerance or profiles that are skewed. An imprecise cut may result in an assembled door having noticeably overlapping edges and an unfinished appearance. Such doors often must be discarded, which ultimately may result in increased production costs.

Thus, there is a need for improved systems and methods of identifying and manipulating objects such as door skins.

SUMMARY OF THE INVENTION

Embodiments of the present invention comprise systems and methods of identifying and manipulating objects. The present invention may be embodied in a variety of ways.

One embodiment of the present invention may comprise a system having a light source adapted to emit a collimated light beam onto the contoured surface of an object. The light beam may be adapted to illuminate a profile, e.g., a collection of rises and declines, of the contoured surface. The system may further comprise a sensor adapted to detect the illuminated profile of the contoured surface. The sensor may be adapted to generate a first signal based at least in part on the illuminated profile.

The system may further comprise a processor in operative communication with the sensor. The processor may be adapted to receive the first signal from the sensor and compare the first signal with a second signal. The second signal may be associated with a predefined profile. The processor may be adapted to generate a third signal based on a comparison of the first and second signals.

The system may further comprise a controller in operative communication with the processor. The controller may be adapted to receive the third signal and generate a motion control signal in response to the third signal. The motion control signal may be based on an attribute of the predefined profile.

The present invention may be better understood by reference to the description and figures that follow. It is to be understood that the invention is not limited in its application to the specific details as set forth in the following description and figures. The invention is capable of other embodiments and of being practiced or carried out in various ways.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION

Embodiments of the present invention comprise systems and methods of identifying and manipulating objects, including those having a contoured surface, such as a door skin with raised or recessed panels. Examples of other suitable objects include solid doors, cabinet doors, cabinet panels, drawer facades, baseboards, decorative molding, or any other object that has a patterned, contoured, or irregular surface.

A fiberboard door skin is a sheet or mat that can be assembled with a door frame comprising rails and stiles to form an assembled door. A door skin may comprise, for example, a nominal caliper ranging between about 0.100 inch and about 0.130 inch molded product using a dry process fiberboard mat initially about two inches thick.

A fiberboard door skin may have one or more patterns of raised and recessed areas. When the door skin emerges from a press, its edges are often irregular, whereas the decorative pattern is generally consistent and well-formed.

According to an embodiment of the present invention, contours or patterns formed on objects, such as door skins, are identified and the object manipulated based at least in part on attributes associated with a specific, predefined contour or pattern. The manipulation can include cutting a door skin to desired dimensions. The present invention utilizes the uniformity and repeatability of the contours or patterns to make consistent manipulations of door skins having similar patterns, thus eliminating or reducing the need to rely on positioning the door skin against a fixed point or making physical measurements in certain embodiments.

Figure 1:
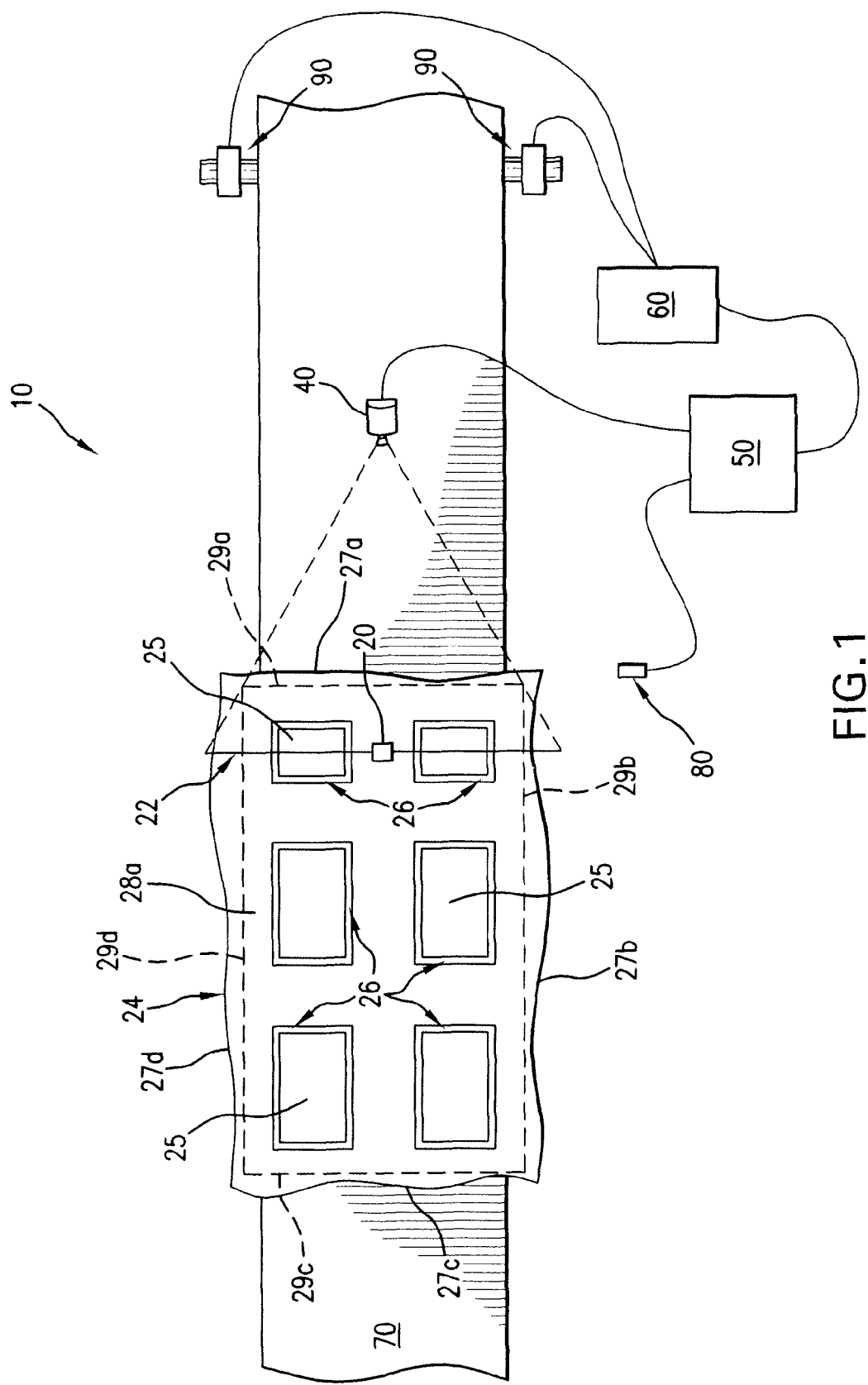
FIG. 1 shows a schematic representation of a system in accordance with an embodiment of the present invention.
Figure 2:
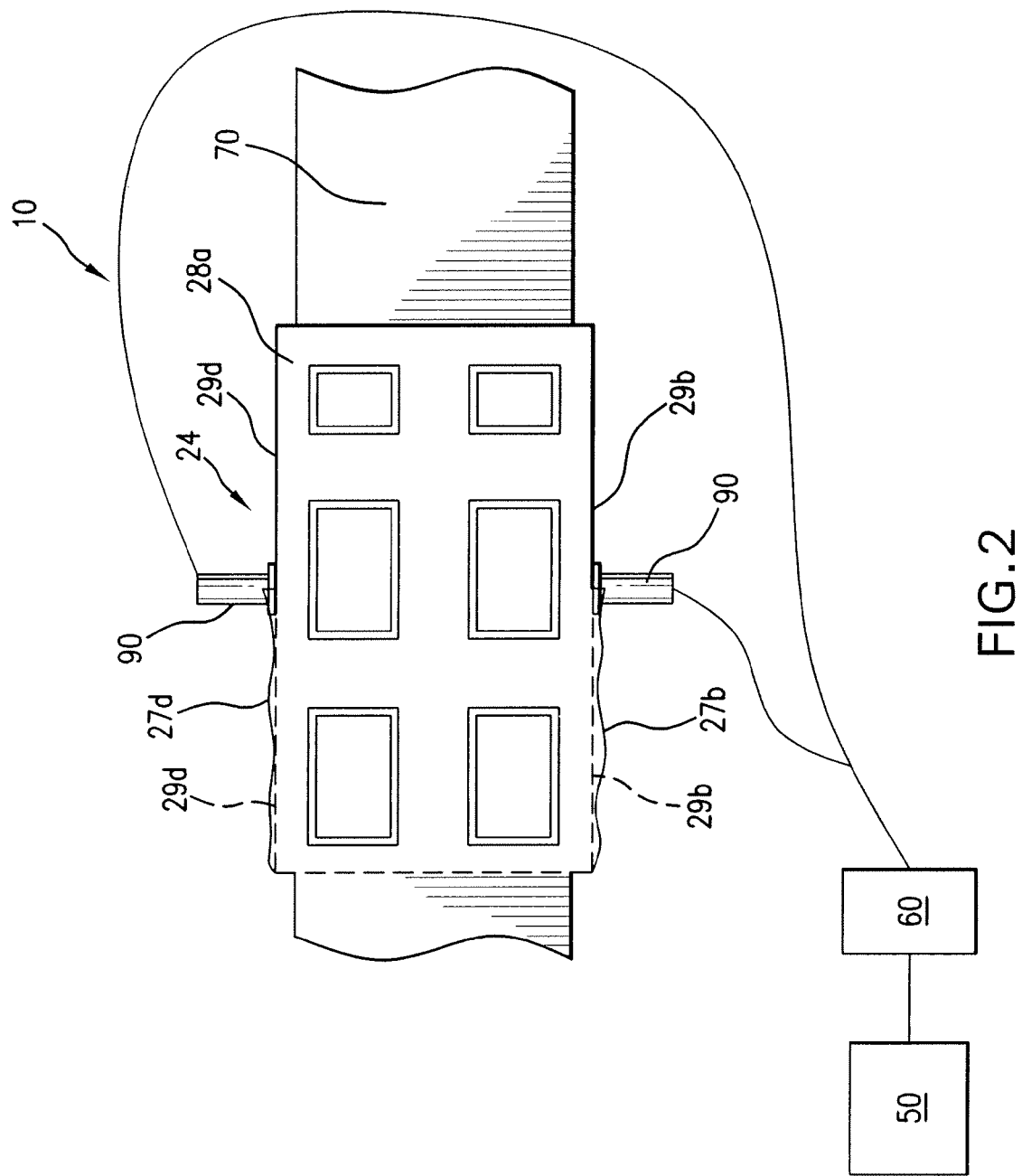
FIG. 2 shows another schematic representation of the system of FIG. 1.
Figure 3:
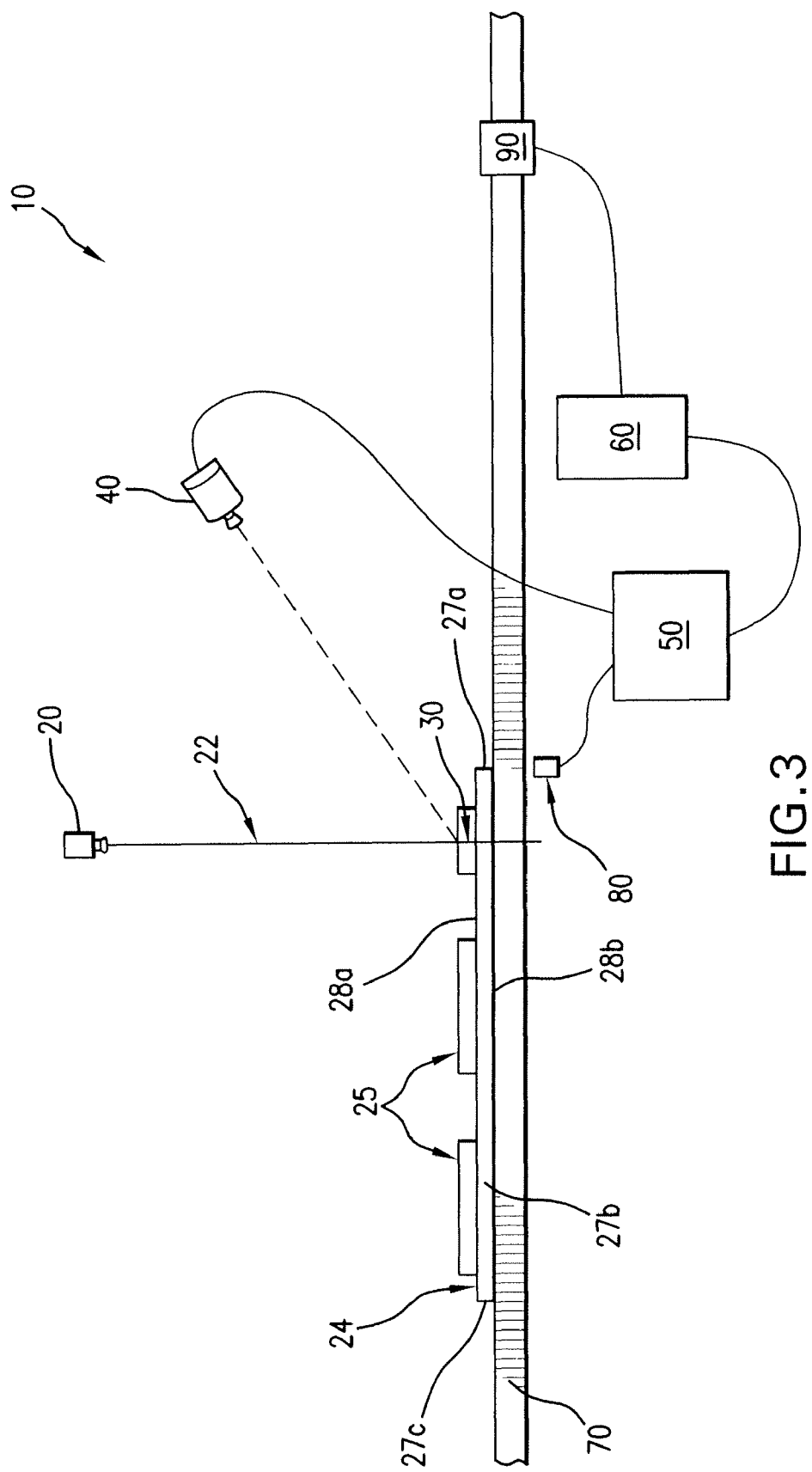
FIG. 3 shows an elevation view of the schematic representation of the system of FIG. 1.

Referring now to FIGS. 1-3, an embodiment of a system 10 according to the present invention is shown. The system 10 comprises a conveyor 70, an emitter 20, such as a light source, and a first sensor 40 and a second sensor 80 disposed in communication with a processor 50. As will be described below in further detail, the first sensor 40 may comprise a camera. The system 10 also comprises a controller 60 disposed in communication with the processor 50 and cutting means 90. The door skin 24 may be positioned on a conveyor 70 adapted to move the door skin 24 through a plurality of stations. One of the stations, for example, may be directly under the light source 20, and another station may be at the cutting means 90.

In one embodiment, the system 10 may identify a door skin 24 by detecting a profile (shown in FIG. 4) of a contoured surface of one of more panels 25 of the door skin 24, comparing the profile with a predefined profile (e.g., a target profile), and generating instructions for manipulating the door skin 24, such as cutting or trimming the door skin 24.

The door skin 24 comprises a first surface 28a and a second surface 28b substantially parallel to the first surface 28a. The first and second surfaces 28a, 28b are substantially planar. Generally, a perpendicular distance between the first surface 28a and the second surface 28b is between about 0.100 inches and 0.130 inches. In one embodiment, the perpendicular distance between the first surface 28a and the second surface 28b is between about 0.110 inches and 0.120 inches. The door skin 24 may have a density in a range between about 50 pounds per cubic foot (pcf) and 70 pcf. Other suitable densities for the door skin 24 may be used.

The door skin 24 comprises six molded panels 25. The panels 25 may be disposed in a plane above and substantially parallel to a plane formed by the first surface 28a. The door skin 24 comprises six molded depressions 26 surrounding the six panels 25. Each of the plurality of depressions 26 is surrounded by the first surface 28a. Alternatively, other suitable configurations may be used.

A plurality of edges 27a-d form a perimeter about the first and second surfaces 28a, 28b of the door skin 24. The edges 27a-d are irregular and non-uniform as a result of the process of manufacturing the door skin 24, as described above. The extent of the irregularity of the edges 27a-d has been exaggerated to facilitate understanding of the present invention.

Desired edges 29a-d are shown in hidden lines. The edges 29a-d are substantially uniform and straight. Edges 29a and 29c are substantially parallel to one another, as are edges 29b and 29d. Edges 29a and 29c are substantially perpendicular to edges 29b and 29d. As will be described in further detail below, the door skin 24 will be trimmed or cut such that the edges 27a-d will be removed and the desired edges 29a-d will form the perimeter of the first and second surfaces 28a, 28b of the door skin 24.

The light source 20 is adapted to emit a collimated light beam 22 onto the first surface 28a of the door skin 24. In one embodiment, the collimated light beam 22 may comprise a laser. Other suitable collimated sources of light may be used, such as linear and multidimensional collimator arrays. In another embodiment, other sources of energy may be emitted onto the door skin, such as for example, infrared energy.

The collimated light beam 22 is projected onto a portion of the door skin 24 on which one or more of the molded panels 25 are formed. The light source 20 is positioned at a first distance from the first surface 28a of the door skin 24. In one embodiment, the first distance may be fixed. Alternatively, the first distance may be variable and adjusted as desired. The first distance may include distances between two and four feet above the first surface 28a. Other distances may be suitable depending on the intensity of the light beam 22 and the sensitivity of the camera 40.

For example, if the light source 20 is positioned too closely to the first surface 28a, the lens that collimates the light beam 22 may disperse the light beam 22 too severely, resulting in a fuzzy reflection of the light beam 22. Conversely, if the light source 20 is positioned too far from the first surface 28a, the light source 20 may not emit a light beam 22 intense enough to clearly reflect off of the first surface 28a.

The light source 20 is aimed to emit the collimated light beam 22 in a direction substantially perpendicular to the first surface 28a of the door skin 24. The light source 20 can be positioned elsewhere, for example to the side of the door skin 24, emitting a collimated light beam 22 obliquely with respect to the first surface 28a of the door skin 24.

Figure 4:
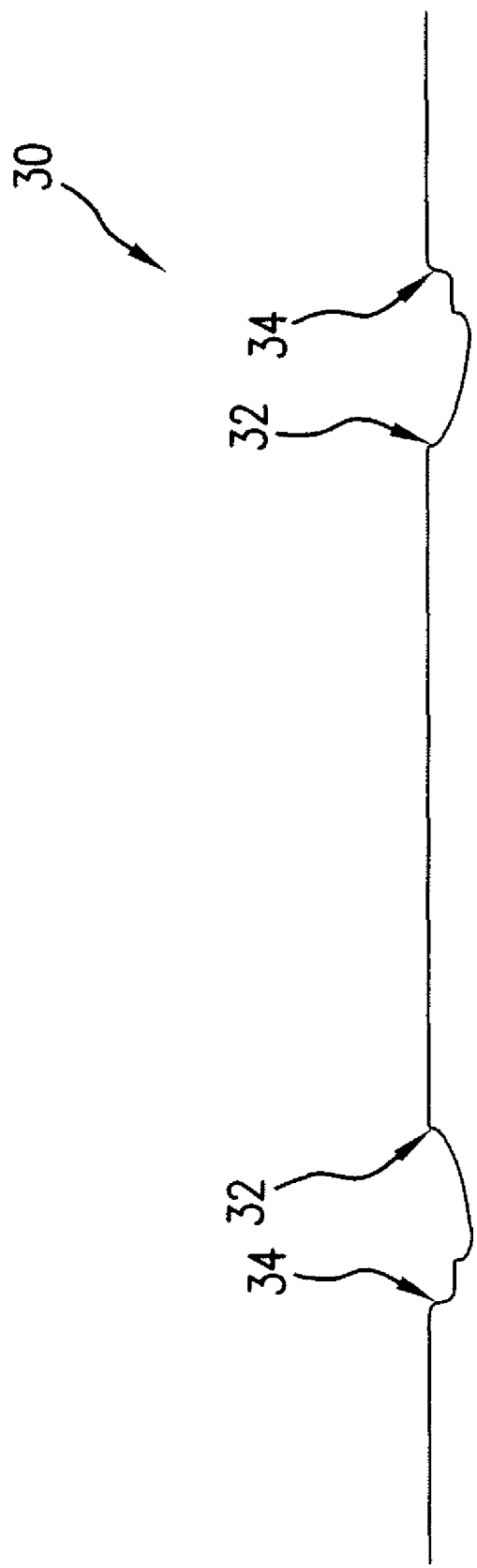
FIG. 4 shows a profile of a contoured surface of a door skin shown in FIG. 1.

Referring now to FIG. 4, a profile 30 of the contoured surface of the door skin 24 illuminated by the collimated light beam 22 is shown. The profile 30 of the contoured surface 26 is visible when the collimated light beam 22 illuminates and reflects off of the contoured surface of the door skin 24. The collimated light beam 22 bends in a predictable pattern based on the contours of the contoured surface of the door skin 24. The raised areas of the panels 25 may be indicated or represented by inclines 32 and the depressions 26 may be indicated by or represented by declines 34 of the profile 30.

Referring again to FIGS. 1-3, a first sensor 40, such as a camera, may be adapted to detect or to view the profile 30 of the contoured surface of the door skin 24 illuminated by the collimated light beam 22. The camera is positioned to receive light reflected from the contoured surface at the area where the collimated light beam 22 impinges on the contoured surface.

The camera 40 is positioned at a predetermined longitudinal distance away from the edge 27a of the door skin 24 and at a predetermined vertical distance above the first surface 28a of the door skin 24. The camera 40 may be positioned between two and 12 feet from the first surface 28a. In one embodiment, the camera 40 may be positioned five to six feet from the first surface 28a.

Positioning the camera 40 obliquely to the first surface 28a of the door skin 24 makes the contours of the door skin 24 visible. The camera 40 may be positioned relative to the first surface 28a at an angle between 20 and 60 degrees. In one embodiment, the camera 40 may be placed at an angle approximately 40 degrees above the plane of the first surface 28a.

If the camera 40 were positioned perpendicular to the first surface 28a of the door skin 24, a resulting profile (not shown) would appear as a straight line, and the contours of the door skin would be imperceptible. In addition, if the camera 40 were positioned coplanar with the first surface 28a, only the highest points of the contours of the door skin likely would be readily discernible.

The camera 40 is adapted to generate a first signal based at least in part on the illuminated profile 30. For example, the camera 40 may capture or record a still image of the profile 30, which may then be converted to a digital signal. Alternatively, the camera 40 may capture or record a moving image of the profile 30.

The camera 40 may comprise a detector, which may be a Charge Coupled Device (CCD) array, or a Complementary Metal Oxide Semiconductor (CMOS) detector array. The camera 40 may also comprise a circuit, control electronics, and an angled light source. In a typical CCD camera, the CCD is an analog device that is capable of holding variable charge, and therefore is able to record varying shades of light. An analog to digital converter within the camera then quantifies the variable charges into discrete shades, representing the light and dark contrasts detected by the camera.

The first signal may be a digital representation of the illuminated profile 30, which typically will be a lighter shade than the door skin 24. The bending of the light beam 22 may be captured by the camera 40 as a pixel pattern on the CCD. The pixel pattern represents light and dark contrasts viewed by the camera 40. The camera 40 is adapted to transmit the first signal to the processor 50. The processor 50 is disposed in operative communication with the camera 40. The terms "communicate" or "communication" mean to mechanically, electrically, optically, or otherwise contact, couple, or connect by either direct, indirect, or operational means.

The processor 50 may comprise a computer-readable medium, such as a random access memory (RAM) (not shown) coupled to a processor (not shown). The processor 50 may execute computer-executable program instructions stored in memory (not shown). Such a processor may comprise, for example, a microprocessor, an ASIC, or state machines. Such a processor comprises, or may be in communication with, media, for example computer-readable media, which stores instructions that, when executed by the processor, cause the processor to perform the processes described herein.

Embodiments of computer-readable media include, but are not limited to, an electronic, optical, magnetic, or other storage or transmission device capable of providing a processor with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions.

Also, various other forms of computer-readable media may transmit or carry instructions to a computer, including a router, private or public network, or other transmission device or channel, both wired and wireless. The instructions may comprise code from any suitable computer-programming language, including, for example, C, C++, C#, Visual Basic, Java, Python, Perl, and JavaScript.

The processor 50 may operate, for example, on any suitable operating system capable of supporting a browser or browser-enabled application, such as Microsoft® Windows® or Linux. Such a processor includes, for example, personal computers executing a browser application program such as Microsoft Corporation's Internet Explorer™, Netscape Communication Corporation's Netscape Navigator™, and Apple Computer, Inc.'s Safari™.

The processor 50 is adapted to receive the first signal generated by the camera 40 and to compare the first signal to a second signal representing or associated with a predefined profile (not shown). The predefined or target profile may be selected at the outset of the process. The target pixel pattern may represent a surface (e.g., contour) characteristic of the door skin 24. For example, before the door skin 24 enters the viewing area of the camera 40, the processor 50 may be directed to compare the illuminated profile 30 with the predefined profile.

Physical values or attributes of a door skin may be associated with a predefined profile. Such values or attributes may include, for example, pixel patterns and/or intensities, dimensions of a door skin or a position or placement of a particular point of a profile, such as a particular edge or side of a particular profile from a particular edge of a door skin or from a particular position of a viewed position. Such values or attributes may also include the locations from a reference point of rises or depressions in the contours of a door skin. The processor 50 may compare a signal associated with measured attributes and respective locations of those attributes in a viewed image with attributes of a predefined profile stored in a database (not shown).

In another embodiment, the processor 50 may compare the first signal to a plurality of second signals. The plurality of second signals may each be associated with a plurality of predefined profiles, for example profiles of a library or compilation of various patterns that may be formed in a door skin. The plurality of predefined profiles may be stored in the database in operative communication with the processor 50.

When comparing the first signal with one of a plurality of second signals, the processor may recognize or identify the second signal that represents or is associated with a predefined profile that matches exactly or matches closely the signal that represents or is associated with the illuminated profile. Where the processor 50 does not match the illuminated profile with one of the plurality of predefined profiles, the processor 50 may compare iteratively the illuminated profile with the other predefined profiles until a match is found or until the database of predefined profiles is exhausted.

The processor 50 is adapted to generate a third signal based on the comparison of the first and second signals. The third signal may comprise information that a value of the first signal equals a value of one of the plurality of second signals, i.e. the third signal may specify which of the plurality of second signals matches the first signal. The third signal may also indicate that the first signal does not equal the value of any of the second signals. As above, the third signal may also indicate that the illuminated profile is offset from the predefined profile, or a given point or position on the predefined profile, by some distance.

The controller 60 is disposed in operative communication with the processor 50. The controller 60 may comprise, for example, a Programmable Logic Controller. In one embodiment, the controller 60 may comprise a relay. In another embodiment, the controller may comprise a microprocessor. The controller 60 may comprise a processor as described above with reference to the processor 50. Other suitable processors may be used. The controller 60 may be adapted to control the entire system 10 or portions of the system 10, such as the conveyor 70 and/or the cutting means 90. Alternatively, the first processor 50 may be adapted to control the system 10 without communicating to the controller 60.

The controller 60 may be adapted to receive the third signal generated by the processor 50 and to generate a motion control signal in response to the third signal. The motion control signal is based on the physical values or attributes discussed above with reference to the predefined profiles. The motion control signal may be referred to as a move instruction, which may be absolute or incremental. The motion control signal may comprise an instruction to the cutting means 90 to move a certain distance to cut or trim the door skin 24.

The distance that the cutting means 90 moves may be based on the offset, or difference, between a position of a predefined (i.e., known) profile and the illuminated (e.g., viewed) profile. For example, the third signal may comprise information that the illuminated profile is offset from the predefined profile by some distance. Alternatively, the third signal may comprise information regarding an offset of a particular reference point of the illuminated profile compared with the predetermined profile. The motion control signal may then direct the cutting means to move that distance so that the cut is made in the appropriate location. Encoders (not shown) are used to provide feedback on the position of the cutting means 90.

Alternatively, the motion control signal may comprise an instruction such that the door skin 24 is moved to another station in a production line without being cut, or that an alert or an alarm signal is communicated to an interface device alerting a human operator that the illuminated profile 30 of the door skin 24 does not match any of the stored, predefined profiles.

The cutting means 90 may comprise one or more saws, knives, or splitters controlled by a servo-motor or other suitable cutting device. The cutting means 90 may be adapted to be displaced relative to the door skin 24, where the displacement of the cutting means 90 is controlled at least in part by the motion control signal. The door skin 24 may be pre-aligned, and the cutting means 90 are adjusted relative to the pre-aligned door skin 24. Alternatively, the door skin 24 may not be pre-aligned, and the door skin 24 may be moved or displaced relative to the cutting means 90.

The cutting means 90 is adapted to receive the motion control signal and may be displaced or moved to cut the door skin 24. As shown in FIG. 2, the cutting means 90 has responded to the motion control signal to cut the door skin 24 substantially aligned with the edges 29b and 29d. Thus, removing the material between edges 27b and 29b and 27d and 29d.

In another embodiment, the system 10 may further comprise a means for aligning the door skin 24 with respect to the conveyor, or alternatively, with respect to the cutting means 90. The aligning means (not shown) may be disposed in operative communication with the controller 60 and may be controlled at least in part by the motion control signal. The aligning means may comprise, for example, guides that contact the sides or the top of the door skin 24, a mechanical arm that contacts the sides or the top of the door skin 24, a portion of the conveyor 70 that contacts the bottom of the door skin 24, or any other means for aligning the door skin 24. The aligning means may be moveable, so as to align a door skin 24 in one of a plurality of orientations. The motion control signal may carry a signal for the movement of the aligning means.

The system 10 may further comprise a sensor 80 in operative communication with the processor 50. The sensor 80 is adapted to detect a position of the door skin 24 with respect to the camera 40. The sensor may be visual, infrared, position, or any other suitable sensor. For example, the sensor 80 may be positioned to detect the position of the door skin 24 when the door skin 24 is in view of the camera 40.

The sensor 80 may communicate to the processor 50 the position of the door skin 24. The processor 50 may be adapted to initiate its comparison of the first and second signals when the processor 50 receives the communication from the sensor 80 that the door skin 24 is in a particular position. The sensor 80 may detect a leading edge of the door skin 24. In another embodiment, a trailing sensor (not shown) may detect a trailing end of the door skin 24. A combination of the sensor 80 and the trailing sensor may detect whether the door skin 24 is aligned properly.

Figure 5:
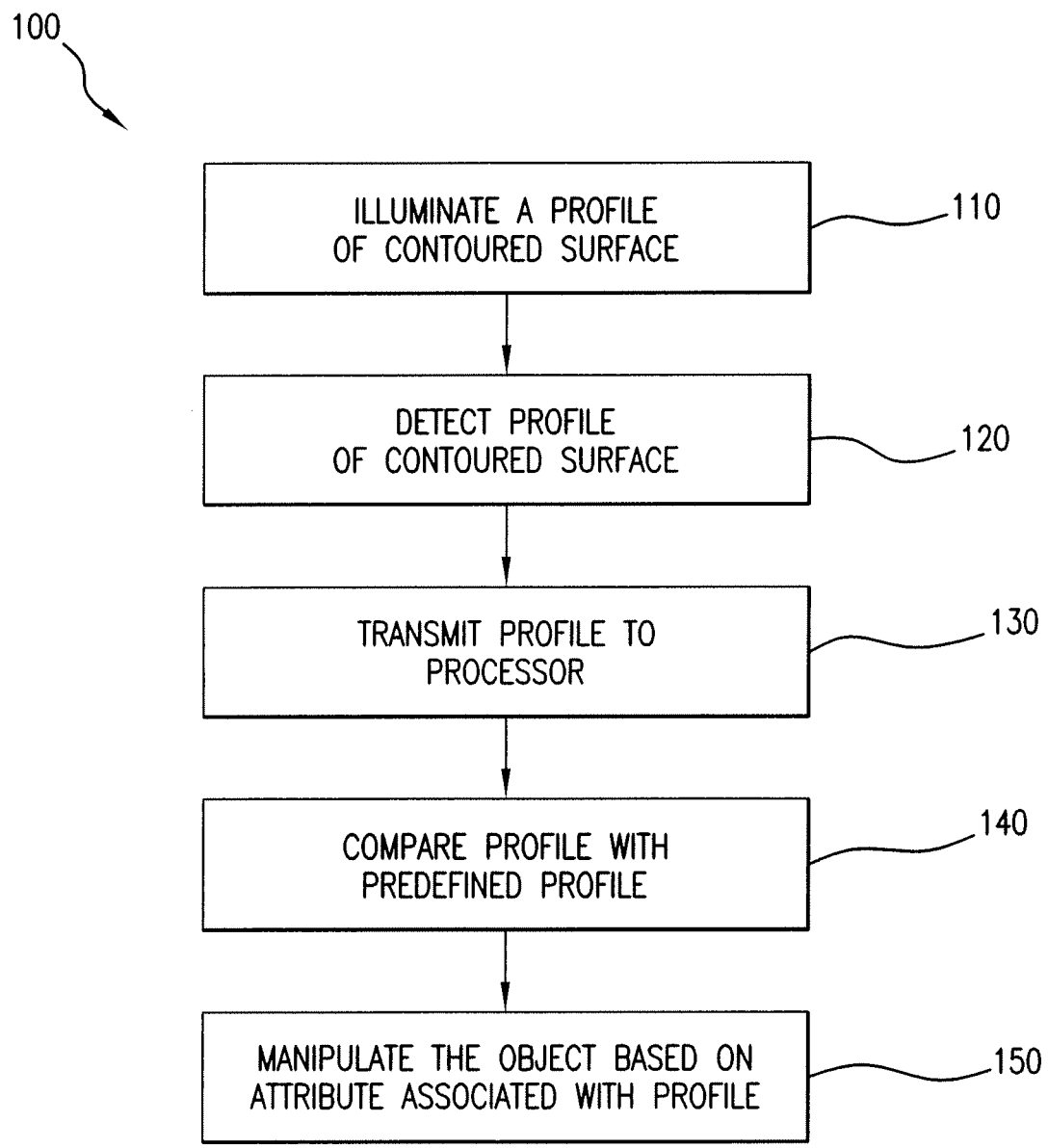
FIG. 5 shows a block diagram of a method in accordance with an embodiment of the present invention.

Referring now to FIG. 5, a method 100 according to an embodiment of the present invention is shown. The method 100 may be used to identify and manipulate a door skin or other suitable objects having a contoured surface.

As indicated by block 110, the method 100 may comprise illuminating a profile of a contoured surface of an object, such as a door skin. The profile may be illuminated by emitting a collimated light beam onto the contoured surface of the object. The profile may be illuminated similarly to that described above with respect to the system 10. Alternatively, other suitable systems or methods may be used to illuminate a profile of an object.

As indicated by block 120, the method 100 may further comprise detecting the illuminated profile of the contoured surface. As described above, the illuminated profile may be viewed by a sensor, such as a camera. Alternatively, the profile may be detected, viewed, or recorded by other suitable sensors.

As indicated by block 130, the method 100 may further comprise transmitting a digital representation of the illuminated profile of the contoured surface to a processor. The processor may be similar to that described above. Alternatively, other suitable processors may be used. The camera may be adapted to generate a digital signal representing the illuminated profile detected by the camera. The sensor may be disposed in operative communication with the processor so that the digital signal generated by the sensor is transmitted to the processor.

As indicated by block 140, the method 100 may further comprise comparing the illuminated profile of the contoured surface with a predefined profile. The profile may be compared with the predefined profile by comparing a first signal representing or associated with the illuminated profile with a second signal representing or associated with the predefined profile.

As indicated by block 150, the method 100 may further comprise manipulating the object based at least in part on a predetermined attribute associated with the predefined profile, for example a particular dimension or position of the profile. As described above, manipulating the door skin may comprise repositioning the door skin, cutting the door skin, or otherwise physically altering the door skin.

A computer-readable medium of a server device, processor, or other device or application comprises instructions that, when executed, cause the server device, application, processor or other device or application to perform method 100. The server device, resource regulating application, and the computer-readable medium may be similar to that described above. Alternatively, other suitable server devices, applications, computer-readable media, processors or other devices or applications can be used.

Figure 6:
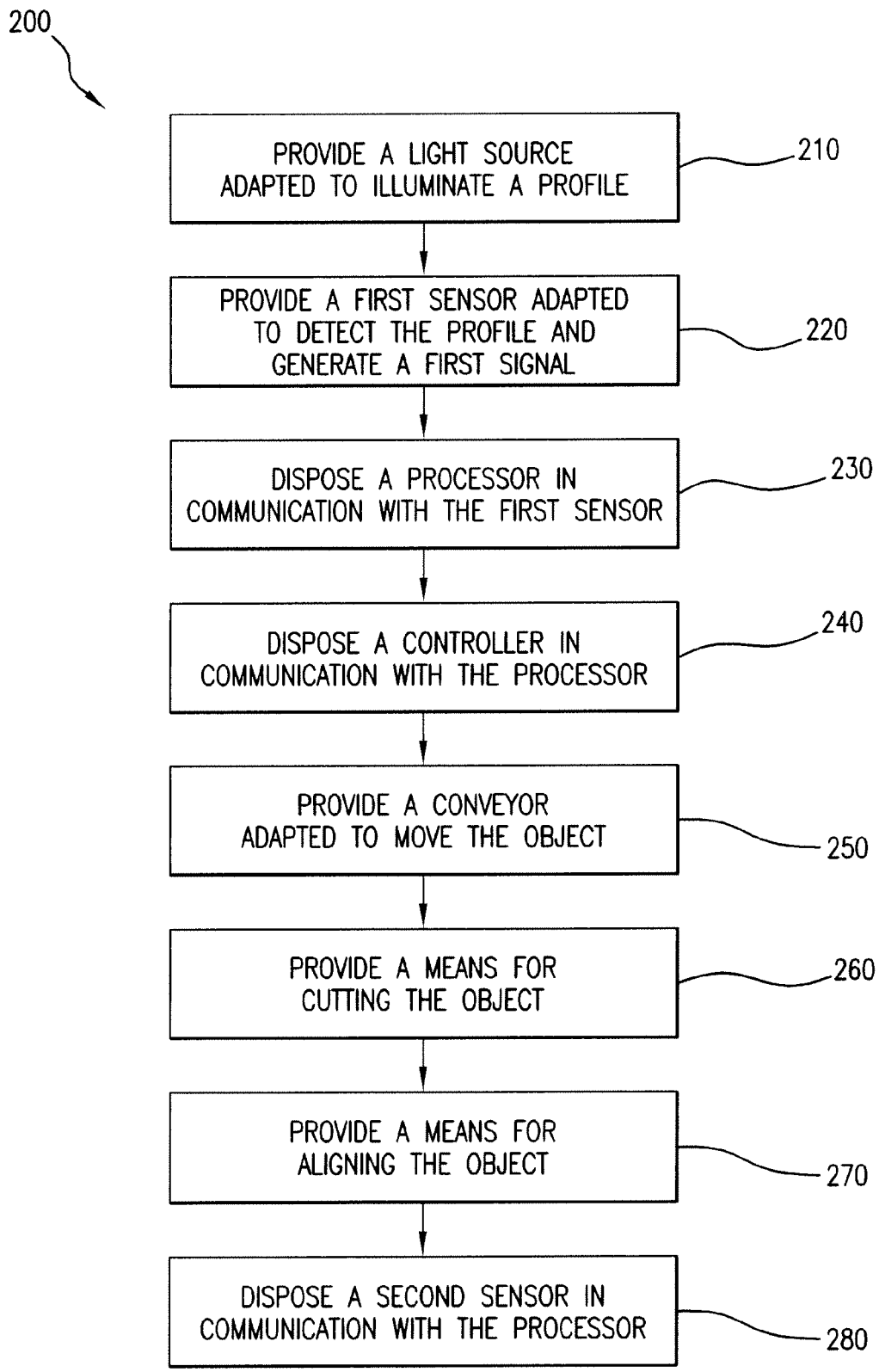
FIG. 6 shows a block diagram of a method in accordance with another embodiment of the present invention.

Referring now to FIG. 6, a method 200 according to another embodiment of the present invention is shown. The method 200 may be used to identify and manipulate an object that has a contoured surface, such as a door skin.

As indicated by block 210, the method 200 may comprise providing a light source adapted to emit a collimated light beam onto a contoured surface of an object, such as a door skin. The light source may comprise a laser. The collimated light beam may be adapted to illuminate a profile of the contoured surface by illuminating the rises and declines in the contoured surface.

As indicated by block 220, the method 200 may further comprise providing a first sensor, such as a camera, adapted to detect the profile of the contoured surface illuminated by the collimated light beam. The camera may comprise a charge coupled device camera, which may view the illuminated profile of the contoured surface. The camera may be adapted to generate a first signal based at least in part on the illuminated profile. For example, the camera may capture a digital image of the illuminated profile and generate a first signal associated with that digital image.

As indicated by block 230, the method 200 may further comprise disposing a processor in operative communication with the sensor. The processor may be adapted to receive the first signal and to compare the first signal with a second signal. The second signal is associated with a digital image of a predefined profile. A plurality of predefined profiles may be stored in a database in operative communication with the processor. One of the plurality of predefined profiles may be selected for comparison with the illuminated profile. The processor may be further adapted to generate a third signal based on a comparison of the first and second signals. For example, the third signal may comprise information about relative or absolute positioning of the door skin, as described above. The third signal may comprise other suitable information.

As indicated by block 240, the method 200 may further comprise disposing a controller in operative communication with the processor. The controller may be similar to that described above. Alternatively, other suitable controllers may be used. The controller may be adapted to receive the third signal and to generate a motion control signal based at least in part on the third signal. The motion control signal may comprise instructions to move or manipulate the object with respect to a given station, such as a cutting station.

As shown by block 250, the method 200 may further comprise providing a conveyor adapted to move the door skin through a plurality of stations. For example, the location at which the door skin is directly under the light source may be one station through which the conveyor moves the door skin, and the location at which the cutting means cuts the door skin may be another such station. As indicated by block 260, the method 200 may further comprise providing a means for cutting the door skin, such as a saw, knife, or splitter controlled by a servo-motor, or other suitable cutting device. The cutting means may be disposed in operative communication with the controller, such that the motion control signal directs the cutting means where to cut the door skin. The conveyor may also be disposed in operative communication with the controller, where the motion control signal directs the movement of the conveyor.

As shown by block 270, the method 200 may further comprise providing a means for aligning the door skin, either with respect to the conveyor or with respect to the cutting means. The aligning means may be disposed in operative communication with the controller and controlled at least in part by the motion control signal. For example, the motion control signal may indicate to the aligning means that the door skin should be moved to another position with respect to the conveyor or with respect to the cutting means. The aligning means may then move the door skin based on the instruction of the motion control signal. The aligning means may comprise guides that contact the sides or the top of the door skin, a mechanical arm that contacts the sides or the top of the door skin, a portion of the conveyor that contacts the bottom of the door skin, or any other suitable means for aligning the door skin.

As indicated by block 280, the method 200 may further comprise disposing a second sensor in operative communication with the processor. The second sensor may be adapted to detect a position of the door skin with respect to the camera or with respect to some other reference point. For example, the second sensor may be positioned to detect the position of the door skin when the door skin is in view of the camera. When the second sensor detects such a position, the second sensor may communicate to the processor the position of the door skin. The processor may be adapted to initiate the comparison of the first and second signals when the processor receives the communication from the second sensor that the door skin is in a particular position.

The foregoing description of illustrative embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the present invention.

The invention claimed is:

1. A system comprising: a light source adapted to emit a collimated light beam onto a contoured surface of an object, the collimated light beam adapted to illuminate a profile of the contoured surface;
   a first sensor, separate from the light source, adapted to detect the illuminated profile of the contoured surface and to generate a first signal based at least in part on the illuminated profile;
   a second sensor adapted to detect a position of the object with respect to the first sensor and generate a position detection signal;
   a processor in operative communication with the first and second sensors, the processor adapted to receive the first signal and position detection signal and to compare the first signal with a second signal associated with a predefined profile, wherein the processor is adapted to generate a third signal based on a comparison of the first and second signals; and
   a controller in operative communication with the processor, the controller adapted to receive the third signal and to generate a motion control signal in response to the third signal, the motion control signal based on an attribute of the predefined profile.

2. The system of claim 1, wherein the processor generates the third signal when a value of the first signal is substantially equal to a value of the second signal.

3. The system of claim 2, further comprising: a conveyor adapted to move the object through a plurality of stations; and a means for cutting the object, the cutting means in operative communication with the controller.

4. The system of claim 3, further comprising a means for aligning the object with respect to the conveyor, the aligning means disposed in operative communication with the controller and controlled at least in part by the motion control signal.

5. The system of claim 3, further comprising a means for aligning the object with respect to the cutting means, the aligning means disposed in operative communication with the controller and controlled at least in part by the motion control signal.

6. The system of claim 1, wherein the attribute comprises a predetermined dimension of the predefined profile.

7. The system of claim 3, wherein the cutting means is adapted to be displaced relative to the object, the cutting means controlled at least in party by the motion control signal.

8. The system of claim 1, wherein the second signal comprises a plurality of second signals associated with a plurality of predefined profiles.

9. The system of claim 8, wherein the plurality of predefined profiles is stored in a database in operative communication with the processor.

10. The system of claim 1, wherein the object comprises a door skin.

11. A method comprising: providing a light source adapted to emit a collimated light beam onto a contoured surface of an object, the collimated light beam adapted to illuminate a profile of the contoured surface;
    providing a first sensor, separate from the light source, adapted to detect the profile of the contoured surface illuminated by the collimated light beam and adapted to generate a first signal based at least in part on the illuminated profile;

providing a second sensor adapted to detect a position of the object with respect to the first sensor and generate a position detection signal;

disposing a processor in operative communication with the first and second sensors, the processor adapted to receive the first signal and position detection signal and to compare the first signal with a second signal associated with a predefined profile, wherein the processor is adapted to generate a third signal based on a comparison of the first and second signals; and disposing a controller in operative communication with the processor, the controller adapted to receive the third signal and to generate a motion control signal in response to the third signal, the motion control signal based on an attribute of the predefined profile.

12. The method of claim 11, wherein the processor generates the third signal when a value of the first signal is substantially equal to a value of the second signal.

13. The method of claim 11, further comprising: providing a conveyor adapted to move the object through a plurality of stations; and providing a means for cutting the object, the cutting means in operative communication with the controller.

14. The method of claim 13, further comprising providing a means for aligning the object with respect to the conveyor, the aligning means disposed in operative communication with the controller and controlled at least in part by the motion control signal.

15. The method of claim 13, further comprising providing a means for aligning the object with respect to the cutting means, the aligning means disposed in operative communication with the controller and controlled at least in party by the motion control signal.

16. The method of claim 11, wherein the attribute comprises a predetermined dimension of the predefined profile.

17. The method of claim 11, wherein the second signal comprises a plurality of second signals associated with a plurality of predefined profiles.

18. The method of claim 11, wherein the object comprises a door skin.

* * * * *